(12) United States Patent
Habig

(10) Patent No.: US 7,861,677 B2
(45) Date of Patent: Jan. 4, 2011

(54) ANIMAL WASTE COLLECTION APPARATUS

(76) Inventor: Meghan E. Habig, 1103 E. State Road 38, Sheridan, IN (US) 46069

( * ) Notice: Subject to any disclaimer, the term of this patent is extended or adjusted under 35 U.S.C. 154(b) by 84 days.

(21) Appl. No.: 12/114,341

(22) Filed: May 2, 2008

(65) Prior Publication Data

US 2008/0271684 A1  Nov. 6, 2008

Related U.S. Application Data

(60) Provisional application No. 60/927,408, filed on May 4, 2007.

(51) Int. Cl.
*A01K 23/00* (2006.01)
(52) U.S. Cl. .................................................. 119/868
(58) Field of Classification Search ............... 119/867, 119/868, 869, 856, 161
See application file for complete search history.

(56) References Cited

U.S. PATENT DOCUMENTS

| | | | | | |
|---|---|---|---|---|---|
| 881,753 | A * | 3/1908 | Whitehouse | ................ | 119/868 |
| 2,190,115 | A * | 2/1940 | Fuqua | .................... | 119/854 |
| 2,519,743 | A * | 8/1950 | Cruise | ................... | 119/869 |
| 2,544,341 | A * | 3/1951 | McGraw | .................. | 119/869 |
| 3,006,343 | A * | 10/1961 | Baxter | ................... | 604/343 |
| 3,036,553 | A * | 5/1962 | Gandier | .................. | 119/869 |
| 3,211,132 | A * | 10/1965 | Hersh | .................. | 604/385.09 |
| 3,656,459 | A * | 4/1972 | Missud | ................... | 119/868 |
| 3,786,787 | A * | 1/1974 | Weinberger | .............. | 119/868 |
| 3,875,903 | A * | 4/1975 | Sarvary | .................... | 119/868 |
| 4,103,645 | A * | 8/1978 | Tyler | ..................... | 119/868 |
| 4,156,402 | A * | 5/1979 | Naiztat | .................. | 119/868 |
| 4,182,331 | A * | 1/1980 | Rodriguez | ................ | 604/514 |
| 4,444,152 | A * | 4/1984 | Berardo | .................. | 119/868 |
| 4,969,419 | A * | 11/1990 | Fong | ..................... | 119/868 |
| 5,315,960 | A * | 5/1994 | Lamp | .................... | 119/868 |
| 5,355,836 | A * | 10/1994 | Vallery | .................. | 119/868 |
| 5,386,802 | A * | 2/1995 | Hang-Fu | ................. | 119/868 |
| 5,819,691 | A * | 10/1998 | Lavi et al. | ............... | 119/868 |
| 5,937,795 | A * | 8/1999 | Raphael | .................. | 119/869 |
| 6,142,105 | A * | 11/2000 | McKnight | ................ | 119/850 |
| 6,494,168 | B2 * | 12/2002 | Weng | .................... | 119/868 |
| 6,722,319 | B1 * | 4/2004 | Chiu | ..................... | 119/868 |
| 6,837,187 | B2 * | 1/2005 | Berardo | .................. | 119/792 |
| 7,174,860 | B2 * | 2/2007 | Solomon | ................. | 119/869 |
| 7,461,616 | B2 * | 12/2008 | Tsai | ..................... | 119/868 |
| 7,506,615 | B1 * | 3/2009 | Sansone et al. | ............ | 119/867 |
| 2005/0022753 | A1 * | 2/2005 | Nakamura | ................ | 119/868 |
| 2006/0124076 | A1 * | 6/2006 | Tseng | ................... | 119/868 |
| 2006/0213456 | A1 * | 9/2006 | Paquette | ................. | 119/868 |
| 2007/0199522 | A1 * | 8/2007 | Bosio Blanco et al. | ...... | 119/868 |

FOREIGN PATENT DOCUMENTS

GB  2238454 A * 6/1991

* cited by examiner

*Primary Examiner*—Rob Swiatek
*Assistant Examiner*—Ebony Evans
(74) *Attorney, Agent, or Firm*—Woodard, Emhardt, Moriarty, McNett & Henry LLP

(57) ABSTRACT

Among other things, apparatus and methods are disclosed for collecting animal waste. A garment or harness is provided for placement on a dog or other animal that collects eliminated waste before the waste contacts the ground, and without having to pick up the waste.

25 Claims, 8 Drawing Sheets

ANIMAL WASTE COLLECTION APPARATUS

REFERENCE TO RELATED APPLICATION

This application claims the benefit of Provisional Application Ser. No. 60/927,408, filed May 4, 2007 and entitled "Pet Poop Collection Apparatus," which is hereby incorporated by reference herein in its entirety.

BACKGROUND

This disclosure relates to a methods and products for use by pet owners, zoo keepers, small animal handlers and others who handle, walk or care for animals. More specifically, this disclosure relates to the problem of solid animal waste and the need to collect such waste so that it does not befoul or remain on sidewalks, streets, lawns, walking trails, beaches or other surfaces.

It is well known that many domesticated animals, for example dogs, leave solid waste in unsuitable places. In the case of domesticated dogs, the animal is taken outside, perhaps into an enclosed yard or walk public walk or other open property, during which period it defecates. If the animal is not allowed outside at least once or twice per day, it is likely to leave its waste inside the owner's house or other living area. In either situation, it is commonly customary (or required by law) for the owner or handler of the animal to remove the waste and transport it for a proper disposal. Of course, that task can be quite unpleasant for the owner or handler in light of unpleasant characteristics of the waste. All too often, owners or handlers do not remove the waste. In that case, it remains unpleasant for others that may use the area. It can also be a health hazard insofar as it carries bacteria and/or other pathogens, which may be transmitted to other organisms directly, through leaching into water sources, or in other ways. Numerous news accounts and other sources note the large percentage of American households that include a dog, and the effects of the waste they leave behind, including pollution of beaches and watersheds.

Other locations, besides parks, trails, beaches and city streets that experience problems with dog waste left behind include dwellings (such as rental apartments, houses, or condominiums) and associated yards, gardens or other spaces. Dog owners and neighbors alike know the unpleasantness of cleaning a yard after a dog, or of discovering unremoved waste. Transportation facilities and businesses relating to animals, and particularly to their travel and habitation, are also confronted with a need to control animal waste efficiently and hygienically.

Attempts to solve pet waste problems, to date, have not satisfactorily resolved these and other solid waste problems that have resulted from the domestication of small animals, especially dogs. With the increasing numbers of dogs in apartments and homes in cities, walking the dog becomes a once- or twice-daily event for an increasing number of households in the United States and around the world. The need to remove pet waste and the problems relating to unremoved waste will accordingly become greater.

A number of methods and products associated with pet waste removal are currently available. Among these are diapers or pads designed for dogs or other small animals. These products allow waste to remain close to the animal, frequently resulting in waste coming in close contact with skin and hair in various places on the animal's hindquarters, even more so if the diaper is not taken off of the animal immediately after use. Another solution has been to provide plastic bags in dispensing devices along walking paths and in parks. The animal's handler or owner can take a bag from the dispenser, use it to pick up deposited waste, tie it or otherwise close it and put the full bag into a bin or trash can. This option requires the bag supply to be constantly monitored and replenished by park or other staff, with the risk of that supply running out and being unrefilled over a significant period of time. In that case, no materials for waste clean-up are available. Special gloves, mitts or bags can be carried by the animal's handler or owner and used to pick up waste. Of course, these and other bag options require the unpleasant handling of the waste through a layer of plastic or other material, or picking up the waste with a scoop and then carrying both the bag and the soiled scoop.

Other efforts to handle pet waste are found in the business and legal realms. Animal owners or handlers can hire a service to clean up after their pets. Local ordinances provide for fines for not removing pet waste from public or other property. These efforts remain dependent on the owner's or handler's resolve to address the waste problem himself or herself, and are after-the-fact options that leave waste on the ground for at least a short period.

Consequently, there remains a need for improved devices and techniques for eliminating the unpleasantness of cleaning up deposited pet waste.

SUMMARY

Among other things, there is disclosed an animal waste collecting apparatus including a garment adapted to be fitted to an animal defining an opening adapted to expose the perineal region of an animal. At least two rigid support posts are attached to the garment adjacent its opening. A disposable waste receptacle having an opening and a structural member about the opening of the waste receptacle is situated so that the structural member is releasably mounted to the support posts at a position so that the receptacle does not impinge upon the rear of an animal and is positioned to receive waste matter when the animal defecates. In some embodiments, the garment can be fitted about only the rear of the animal, and/or the rigid support posts are arranged on opposite sides of the garment's opening. The waste receptacle may be made of biodegradable material, and may possess a closure device. The garment may be made of an elastic fabric, or may also include a carrying mechanism attached to the garment, which may be a spring-loaded hook, pocket, a loop or strap (e.g. of hook-and-eye material), or other holding structure, adapted to grip or contain the receptacle after the receptacle is removed from the posts.

There is further disclosed an apparatus for collecting animal waste, which includes a garment adapted to be fitted to an animal, the garment defining an opening about the perineal area of the animal. One or more support posts, which may be rigid or inflexible, are attached to the garment near its opening, and a support ring is releaseably mounted on the support posts, so that the support ring is held rigidly in place and does not impinge upon the perineal area of the animal. An animal waste receptacle is mounted on the support ring and positioned to collect waste when the animal defecates. The garment may have a carrying device to releaseably attach the waste receptacle after the waste receptacle has been used. The animal waste receptacle is biodegradable or otherwise disposable, and may possess a closure device. In some embodiments, the support ring is a part of the receptacle. The garment can be made of woven natural or synthetic fibers, and/or may include a plurality of straps connected to a linking ring, at least one of said straps directly connecting the linking ring to a collar.

Further disclosed is an apparatus for collecting animal waste, which includes a garment made of elastic fabric adapted to be fitted to the rear portion of the animal, the garment defining an opening about the anal area of the animal. Two rigid support posts are attached to the garment with substantially a horizontal orientation to each other when the garment is fitted to the animal, and they are situated on opposite sides of said opening of said garment. A disposable waste receptacle having an opening is affixed to a support member is affixed around the waste receptacle's opening, and the support member with said affixed waste receptacle is releasably attached to the support posts on the garment. The support member is rigidly fixed at a position so that the support member does not impinge upon the rear of the animal and is positioned to receive waste matter when the animal defecates. A hook can be connected to the garment, the hook being adapted to hold the receptacle when it has animal waste within it, and the hook may be a spring-loaded hook and may be positioned away from said opening in said garment.

The pet waste collection apparatus of the present disclosure overcomes the problems associated with prior art. A mitt or baggie is not required to be carried by the owner, picking up dog piles is not needed, unsightly waste is not witnessed by others and disposal of waste is made much easier. Embodiments of the apparatus of the present disclosure utilize a design to be more comfortable to an animal when using the apparatus, and provide for a design that can be more pleasing to the eye, encouraging more animal owners to use such an apparatus.

DETAILED DESCRIPTION OF THE ILLUSTRATED EMBODIMENTS

Figure 1:
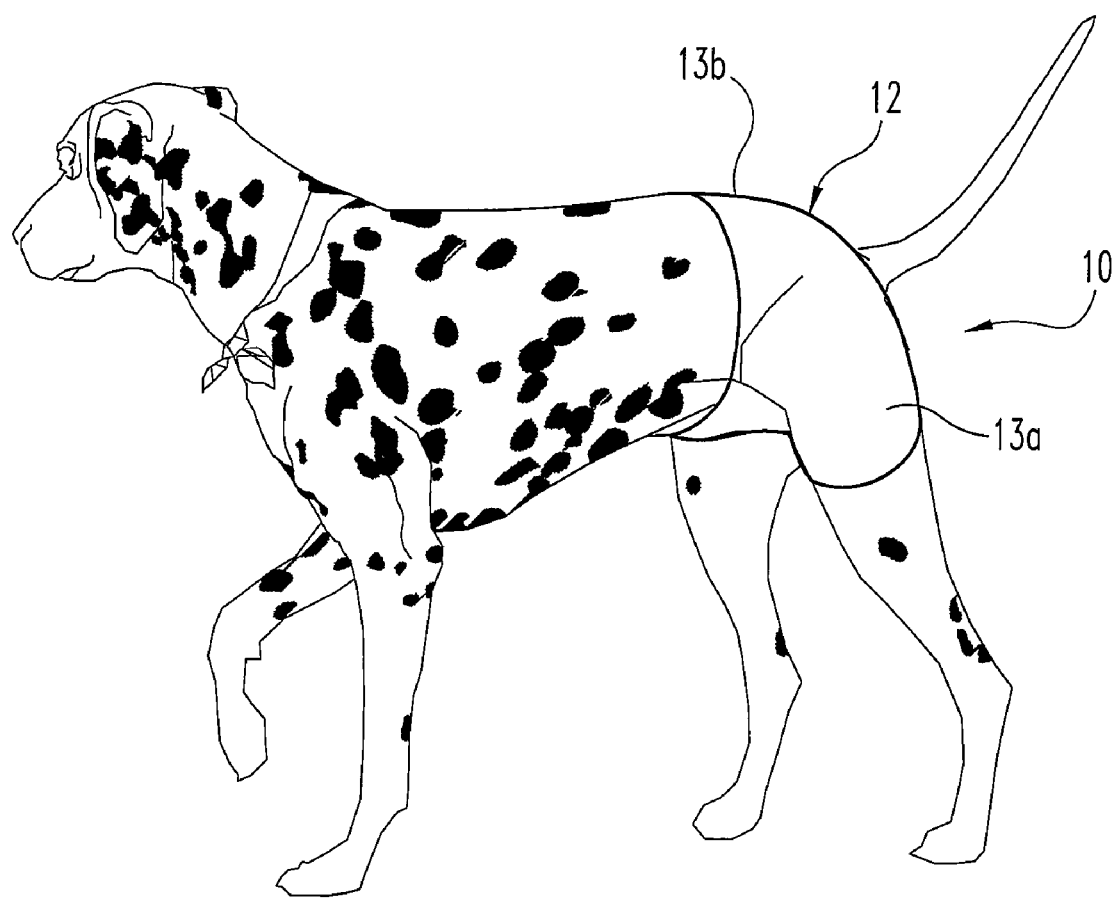
FIG. 1 is a front side perspective of an apparatus embodiment according to the present disclosure.

For the purposes of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein are contemplated as would normally occur to one skilled in the art to which the disclosure relates.

Figure 2:
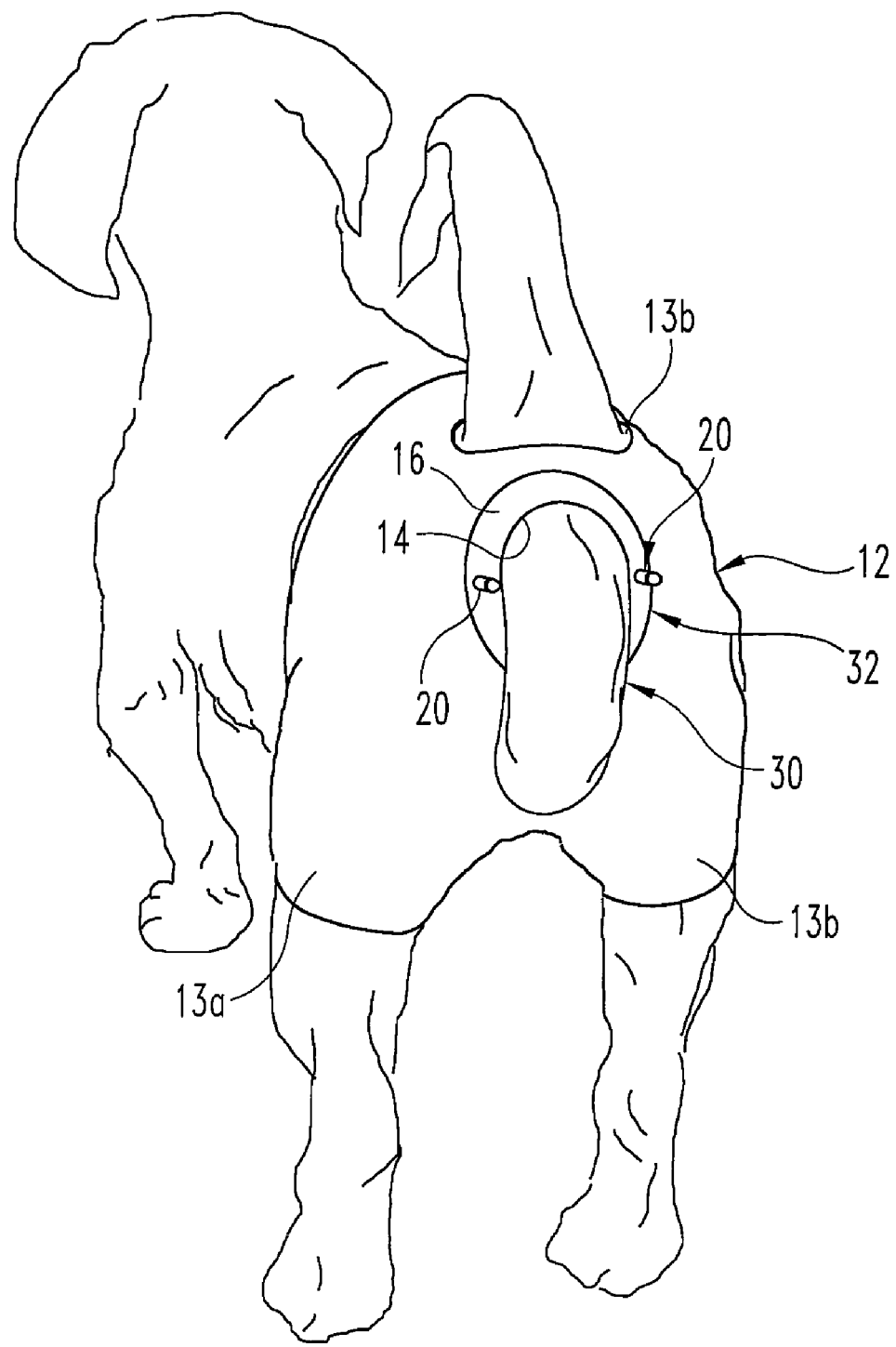
FIG. 2 is a rear perspective view of a dog wearing the apparatus of FIG. 1.
Figure 3:
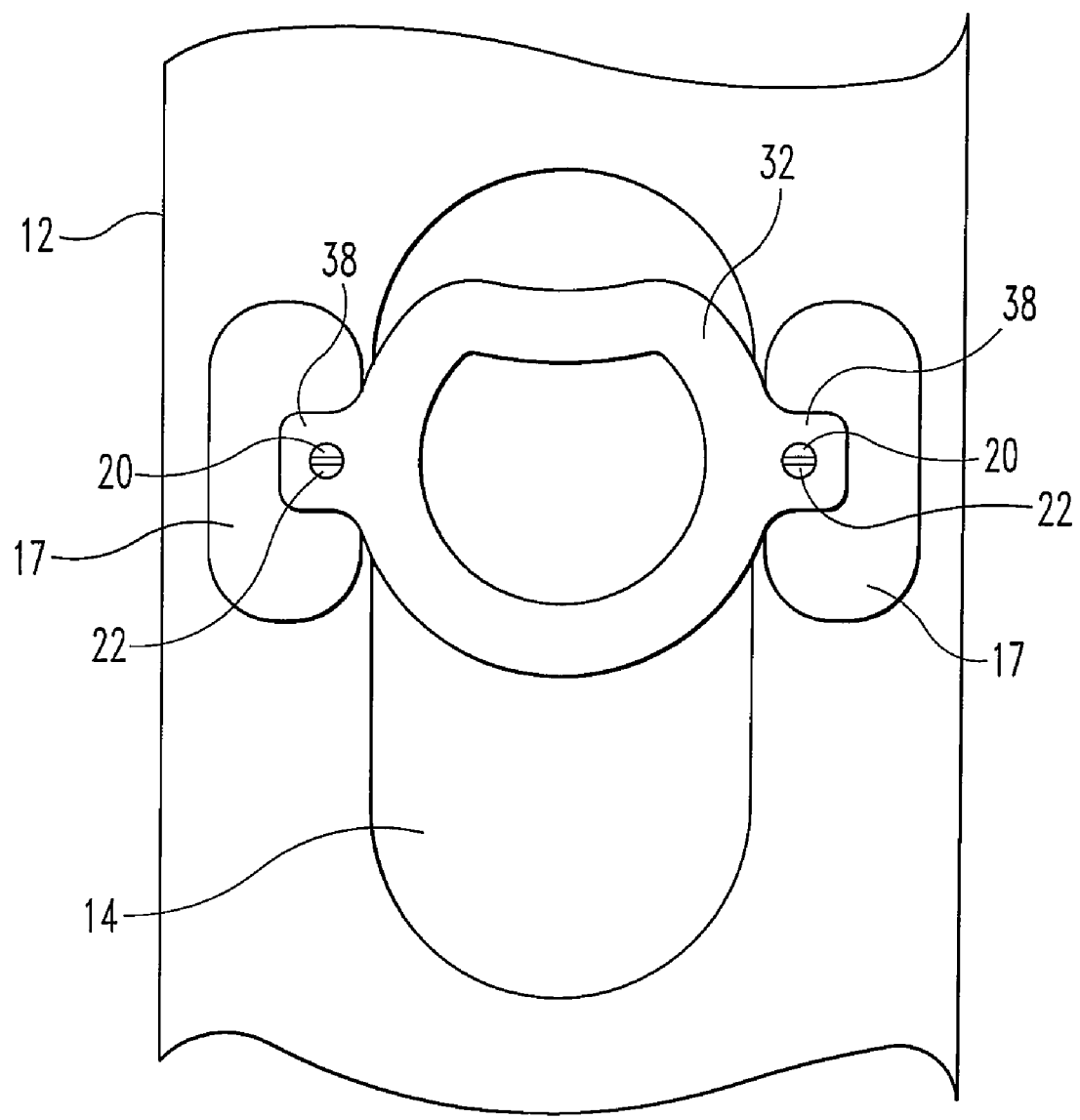
FIG. 3 is a top view of a part of the apparatus of FIG. 1 in one embodiment.
Figure 4:
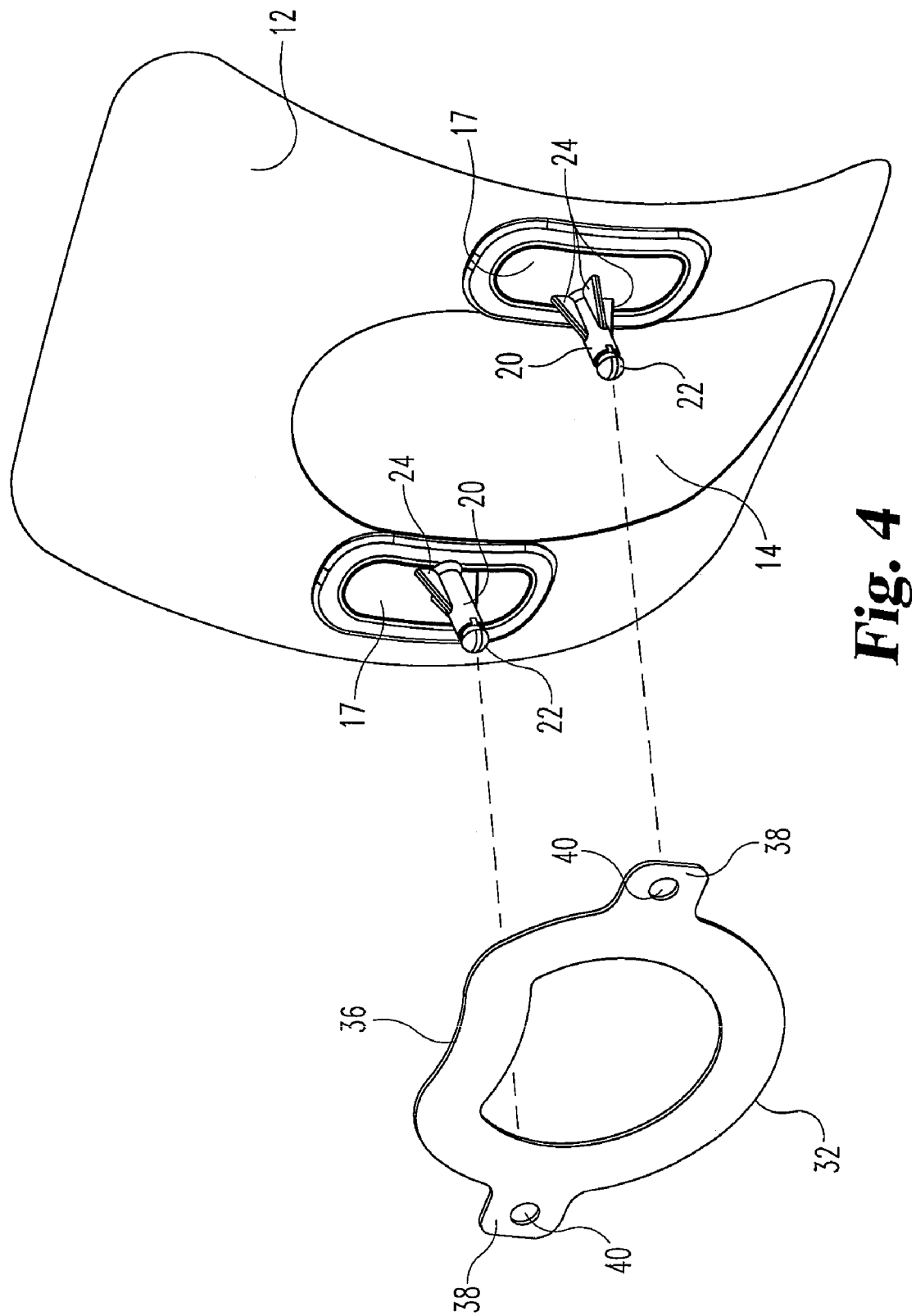
FIG. 4 is a perspective exploded view of the apparatus shown in FIG. 3.

Turning first to the embodiment shown in FIGS. 1-3, there is shown a device 10 to be worn by the animal whose waste is to be collected. Device 10 includes a garment 12 having a two sleeves or pant-legs 13a through which the animal's legs extend, and a body portion 13b that extends around the animal's body proximate to its hindquarters. Thus, the natural or synthetic fabric of garment 12 covers most of the rear part of the animal. A hole is preferably provided to allow the animal's tail to extend through garment 12 substantially unimpeded. Garment 12 defines an opening 14 corresponding to the perineal area of the animal. Opening 14 may be reinforced, as by a plastic reinforcing ring 16 or reinforcing plates 17 (FIG. 3).

Attached to garment 12, on each side (laterally) of opening 14 in this embodiment, are rigid support posts 20. Posts 20 extend from garment 12 and away from the animal. Posts 20 have a cylindrical body in one embodiment, with a cap or top portion 22 that can be conical and compressible, forming an underside ledge. Posts 20 may be attached directly to the fabric of garment 12, or to reinforcements such as ring 16 or plates 17. Support buttresses 24 extend from the illustrated embodiments of post 20 to provide additional stability.

Figure 5:
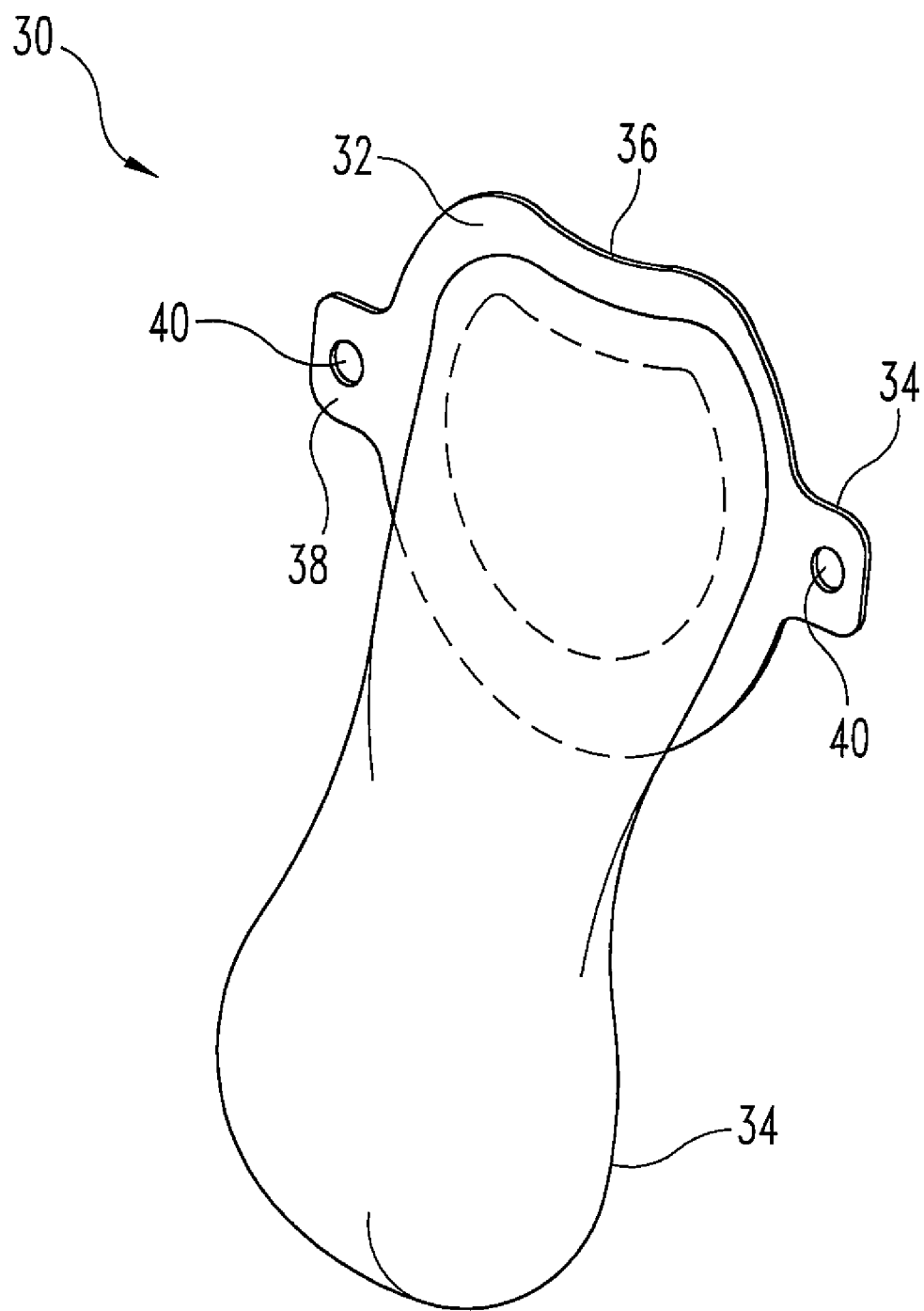
FIG. 5 is a perspective view of part of the apparatus shown in FIG. 3 with further structure attached.

A waste collection receptacle 30 (shown completely in FIG. 5, and partially in other figures for the sake of clarity in the drawings) is releasably attached to the posts 20. Receptacle 30 includes a support piece 32 and a bag 34 attached to and extending from support 32. Support 32 is generally in the shape of a flat ring or gasket, circular in the main but having an indented or concave portion 36 on one side. In the illustrated embodiment, support 32 includes a pair of tabs 38 that extend diametrically opposed from each other, and each are about 90 degrees around support 32 from the center of concave portion 36. Tabs 38 each include a respective hole 40 with a diameter the same as or slightly larger than that of posts 20.

The illustrated embodiment also shows a bag 34 that has a mouth attached to and about the same size as support 32, so that the mouth of bag 34 attaches to the entire perimeter of support 32 without being overly stretched or leaving significant gaps. The length of bag 34 is substantially greater than the diameter of support 32, so that the bottom of bag 34 extends some distance away from support 32. Bag 34 is attached to support 32 by adhesive, by fusing to support 32, by stapling or similar physical attachment, or by other means.

Receptacle 30 is connected to garment 12 via posts 20. Cap portion 22 of each post is inserted through a respective hole 40 in support 32. The conical compressible cap portion compresses as hole 40 passes over it, and releases or re-expands after the hole 40 passes it, so that support 32 is retained on posts 20 by the underside ledges of cap portions 22. Each cap portion 22 can be re-compressed to release support 32 from garment 12. In this way, receptacle 30 is releasably attached to garment 12 so that waste can be deposited directly in bag 34, and receptacle 30 can then be detached and discarded at an appropriate time.

Use of the above-described structure will now be described with respect to a dog, but it will be understood that it may also be used with other animals. As indicated above, garment 12 is placed on the dog so that the animal's hind legs extend through sleeves 13a and its anal/perineal area is adjacent opening 14. A receptacle 30 is attached to garment 12 as indicated above, by inserting posts 20 through holes 40 in support 32. When the dog squats to defecate, its perineal area is lowered and pivoted between its legs. That lowering and pivoting action also pivots garment 20 and receptacle 30 firmly attached to it. With that pivoting, bag 34 moves from a drooping state (with its mouth attached to support 32 and the remainder hanging down behind) to a straighter or more-open state. In that straighter or more-open state, bag 34 extends toward the ground with little or nothing of itself obstructing a path from support 32 to the bottom of bag 34. When waste is expelled, it falls through support 32 and directly into and through bag 34 to its bottom.

When the dog is finished, it raises back up. Bag 34 maintains the waste away from both the dog and the ground. The owner or handler may immediately remove receptacle 30 from support 32 by pinching tops 22 of posts 20 and pulling tabs 38 off of posts 20, and throw receptacle 30 away. Ties may be provided to close the neck of bag 34, or it can be knotted. A new receptacle 30 can be attached at once to garment 12 as indicated above in case there is further waste to be eliminated, or the handler may leave a receptacle off of garment 12 if he or she desires. Alternatively, the owner or handler can allow receptacle 30 to remain attached to garment 12, particularly if a trash can or other appropriate bin is not immediately available. Receptacle 30 retains the waste away from both the animal and the ground, and bag 34 hangs down between the animal's hind legs so as not to interfere with its tail or walking stride. Detachment and disposal can take place at the owner's convenience. The disposal of animal waste thus becomes easier, cleaner and less unpleasant.

Variations in the structures noted above can be made without departing from the spirit of this disclosure. As examples, support 32 may be semi-rigid or somewhat flexible, rather than a hard or rigid plastic or other material. Bag 34 can be made of a variety of plastics, or may be made of sturdy paper. For environmental purposes, biodegradable or flushable materials can be used for bag 34. The garment may be made of individual straps or a combination of straps and fabrics rather than a continuous fabric covering. Of course, garment 12 may be produced in various colors or styles to suit the individual animal owner's tastes and preferences. For example, as illustrated in FIG. 1, the garment 12 can look like shorts for an animal, in one case a dog, made from one or more pieces of fabric.

Figure 6:
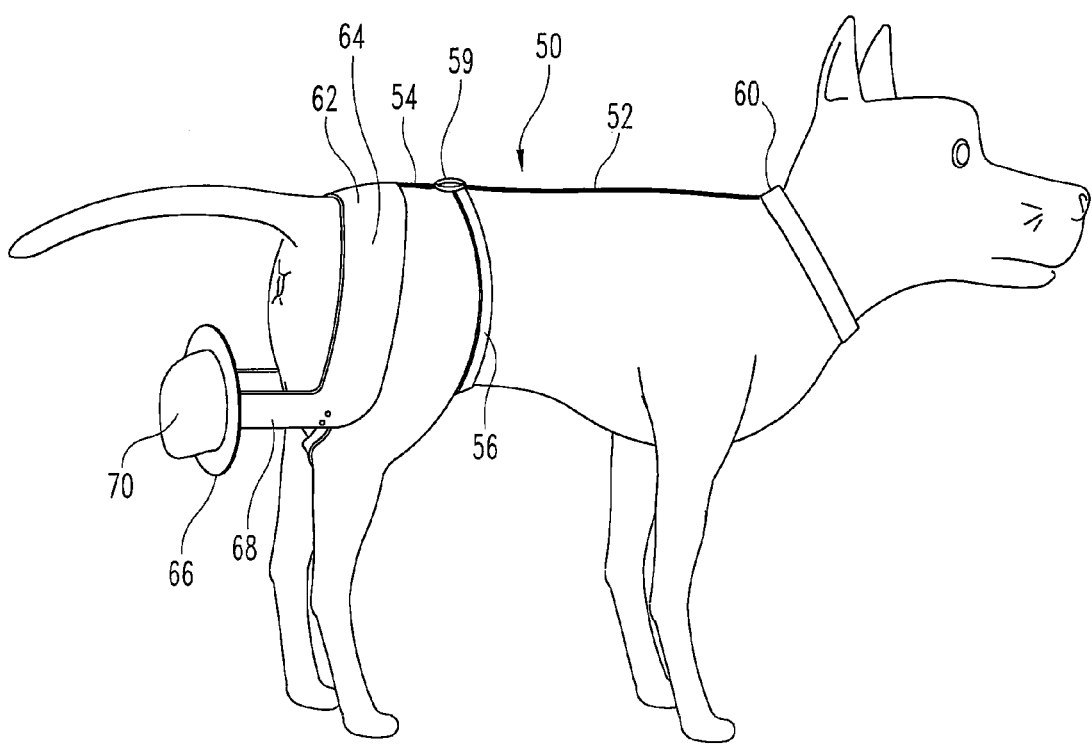
FIG. 6 is a side view of a dog wearing another embodiment of an apparatus according to the present disclosure.
Figure 7:
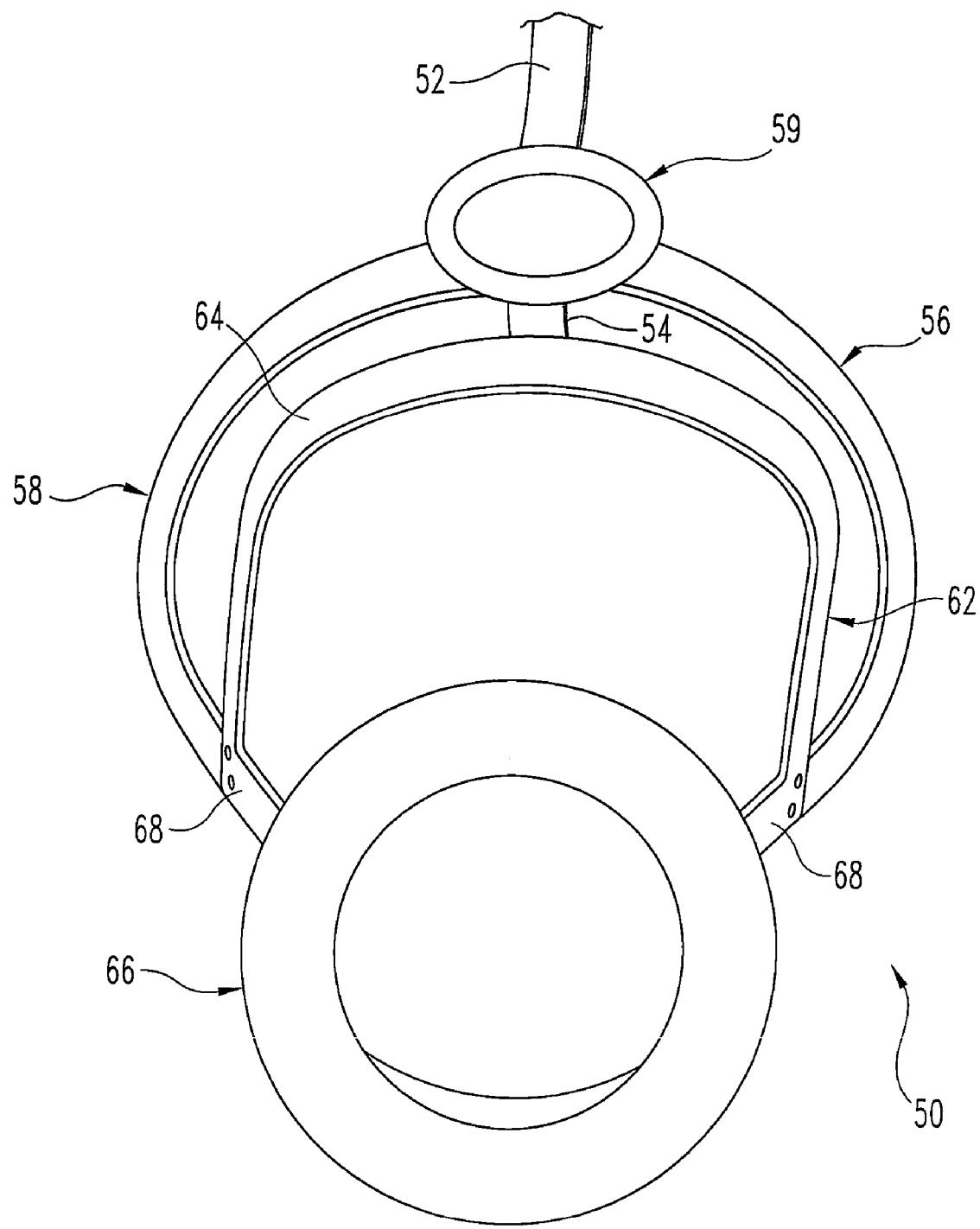
FIG. 7 is a rear perspective view of the embodiment of FIG. 6.
Figure 8:
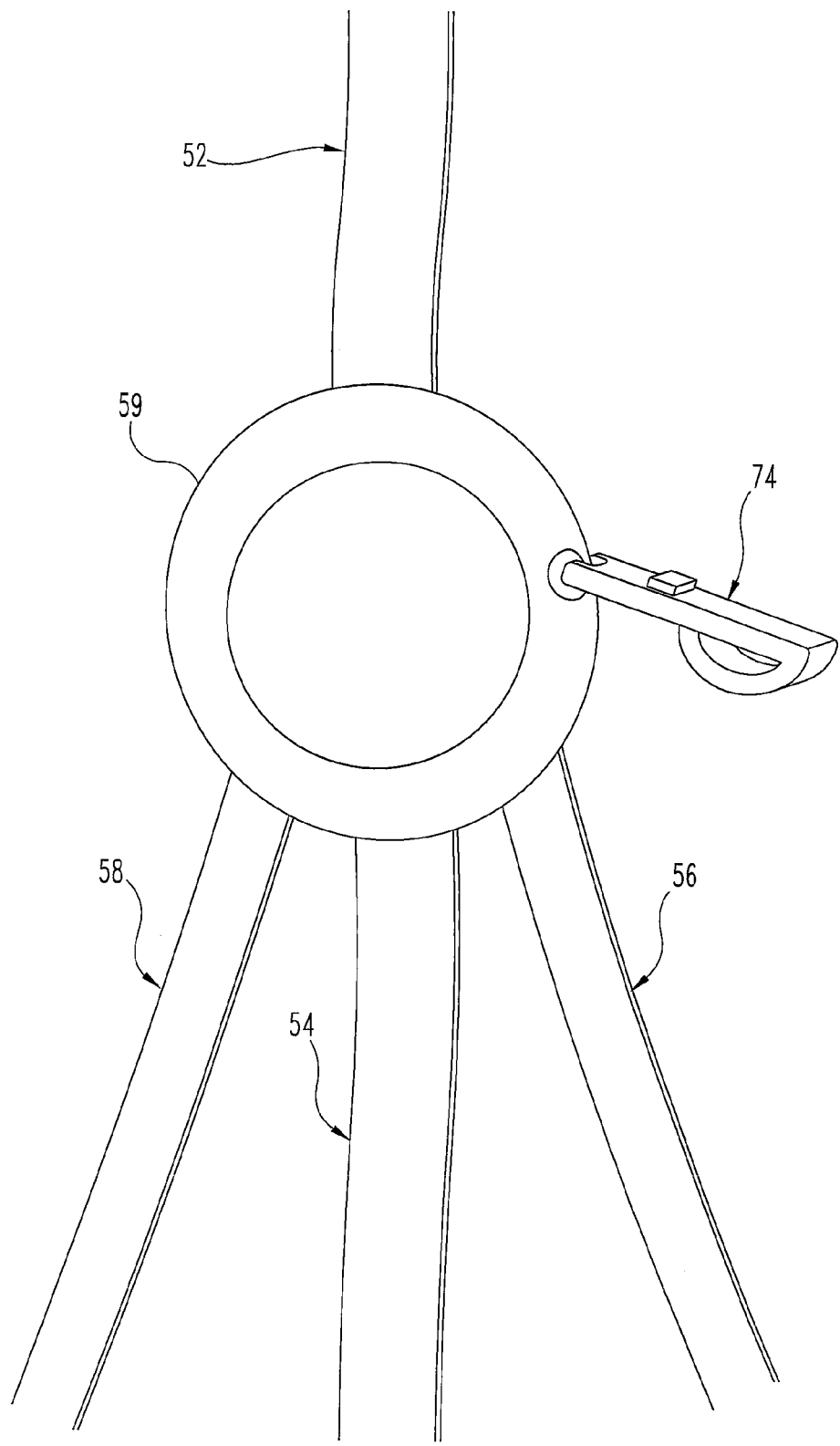
FIG. 8 is a top view of a portion of the embodiment of FIG. 6, featuring additional structure.

Other examples of garments could be fashioned from a series of straps around the animal, a ring or similar attachment for bag(s) or collection reservoir(s), adjustment mechanisms, and/or hooks or other carrying mechanisms for bags after defecation, as seen in another example of a harness or garment 50 in FIGS. 6-8. In that example, a set of straps 52, 54, 56, 58 each are attached to a linking ring 59. Strap 52 extends between ring 59 and collar 60 secured to the animal's neck. Strap 54 extends substantially opposite to strap 52, between ring 59 and an upper part of a support 62. Straps 56 and 58 attach to opposite sides of ring 59, each between straps 52 and 54, and straps 56 and 58 each runs down the side of the animal and under a hind leg to attach to a lower portion of support 62. Straps 52 and 54 provide stability along the animal's back, while straps 56 and 58 maintain support 62 in a centered position with respect to the animal.

Support 62 has a generally horseshoe-shaped frame 64, a rim or ring member 66, and two extending posts 68 that connect frame 64 to ring member 66. Frame 64 is shaped and sized so as to be placed on the rear-most part of the animal's back, but not to interfere with the tail. In that regard, frame 64 may include a notch or indentation that accommodates the animal's tail. The sides of frame 64 extend downward toward but not interfering with the animal's hind legs. Posts 68, in the illustrated embodiment, are at the end of the sides of frame 64 and extend perpendicularly to frame 64. Ring member 66 is perpendicular to posts 68 and posts 68 are at opposed points of a diameter of ring member 66—that is, there is a measurement of 180 degrees around ring member 66 between posts 68. Support 62 is sized and configured so that ring member 66 is proximate to the anal/perineal area of the animal, and that when the animal squats, the opening of ring member 66 is below the animal's anus. A bag 70 is attached to ring member 66 by clips, adhesives, by folding over ring member 66, by connection to projections from ring member 66, or by other means. As discussed above, when the animal squats, bag 70 becomes straighter or more open, allowing waste to fall into it with little or no hindrance from the sides of bag 70. The straps and ring member may be thought of as forming an opening about the perineal area of the animal, as is the case with garment 12, to allow the animal to defecate through ring member 66 and into bag 70.

Ring member 66 may also have a hook or clip 74 attached to it. Hook 74, in this embodiment, includes a spring-biased closure and is securely but non-rigidly connected to ring member 66, as by a cotter pin or ring connection with an eye on ring member 66. When waste has been deposited in bag 70, bag 70 may be removed from ring member 66, may be closed with a tie or a knot, and may be hung on or otherwise held by hook 74. For example, the closure of hook 74 may be opened, a portion of bag 70 may be placed between the closure and a stop portion, so that release of the closure causes bag 70 to be gripped between the closure and the stop portion. In this way, the animal carries bag 70, rather than the owner or handler, until a suitable site for disposal is reached.

In use, garment 50 is fitted according to the size of the animal for which it is to be used, as by adjusting straps for comfort and to ensure proper positioning of ring member 66. Variations for different gender and size may be made. The connected straps are placed around the rear part of the animal over its back, and the tail protrudes between the over-the-back straps (straps 52 and 54) on one hand and ring member 66 and bag 70 on the other. As noted above, ring member 66 falls into place over the anal/perineal portion of the animal without impinging on it. Leg straps 58, 60 are secured between ring 59 and ring member 66 and tightened as may be necessary. Bag 70 is placed, if not already attached to ring member 66.

As with garment 12, discussed above, the animal is allowed to walk, run or otherwise move with a leash or freely with garment 50 in place. Upon experiencing the need to defecate, the animal will assume the usual squatting position, with no hindrance from garment 50 or ring member 66. Waste falls into bag 70, which remains securely attached to ring member 66. Bag 70 may be removed immediately and closed, e.g. with an embedded drawstring, a separate tie, by knotting, or by another method, and a replacement bag is attached. The filled bag can be manually hung from hook 74, and upon locating an acceptable disposal site (e.g. flush toilets, bins, trash cans) filled bag 70 is dropped off. The animal can continue with garment 50 in place.

In this embodiment, support 62 is a single piece of rigid or semi-rigid material, for example plastic. In other embodiments, ring member 66 may be a separate piece, substantially like support member 32 discussed above, for example. In such embodiments, posts 68 may be configured similarly or identically to posts 20, discussed above, so that ring member 66 can be securely attached to posts 68, and detached from posts 68 when bag 70 has been used. Any or all of the straps may be adjustable, so as to fit comfortably on a range of sizes of dogs or other animals.

Posts 20 or 68, and support 32 or ring member 66, are preferably made from a rigid material, such as plastic (examples are polystyrene, polyvinyl chloride, polyester, nylon, or polycarbonate, but other plastics may be used), wood or metal. Such rigid materials will support a waste receptacle to collect the animal's waste, and will maintain their shape as the animal squats, allowing a clear elimination into a bag as described above. In embodiments in which posts 20 or 68 are not integral with or fixed to other rigid parts, such as plates 17 or frame 64, they may be attached to the garment by stitching, riveting, gluing, tying, or other means.

In various embodiments, the support piece of the receptacle (e.g. support 32 or ring member 66) can be rigid or semi-rigid, and may be an integral piece of the receptacle or a separate piece. The support piece may be made of the same material as the receptacle or different material. The receptacle and the support piece of the receptacle can be made of plastic, paper, biodegradable material or flushable material. As noted above, the support piece and/or a waste bag is releasably attached to support posts so that the receptacle is held a distance from the animal and puts the waste receptacle opening at an effective angle with respect to the animal, so that when the animal defecates, the waste falls into the receptacle. Optionally the waste receptacle possesses a device for closing the opening after it has been used to isolate the waste before disposal. The closure device could be a drawstring, for example.

In embodiments in which the garment of the apparatus is defined by a series of straps, the straps define an opening about the perineal area of the animal, and attached to each side of the opening are rigid support posts that may be part of a larger support or frame. A waste receptacle with a support piece about the receptacle's opening is monolithic with, fixed to or releasably attached to the posts so that it is held a distance from the animal and at an effective angle with respect to the animal, so that when the animal defecates, the waste falls into the receptacle. The support piece of the receptacle can be rigid or semi-rigid. The receptacle can be made of plastic, paper, biodegradable material or flushable material.

It has been discovered that aspects or features described above may be used with embodiments other than those with which they have been described. For example, in any of the above embodiments, a carrying mechanism (e.g. hook 74) may be attached to the garment for carrying the waste receptacle after the waste receptacle has been used.

The apparatus of the present disclosure may be made to fit all sizes of dogs or other animals, male and female, and can be attached to collars or harnesses if requested. A strap embodiment as described above may be adjusted to fit a variety of sizes of animal, and thus one apparatus is easily tailored to the needs of the animal's owner or handler. Straps, fabrics and other aspects of garments can be color coordinated and made from various materials for the "fashion conscious owners." Embodiments of the apparatuses disclosed herein are intended not only for dogs, but for other animals, for use in traveling or while pets are home alone and non-domesticated animals requiring transport without worry of defecation or its consequences.

The "as you go" nature of the waste collection apparatus of the present disclosure overcomes many problems associated with prior devices or schemes. A pet owner or handler is not required to carry a mitt or baggie, picking up waste is not needed, unsightly eliminations are not witnessed by others, and disposal of waste is assured as the animal carries the waste bag to the nearest disposal site. Apparatus as disclosed herein is designed to fit all sizes of dogs, male and female, and can be attached to collars or harnesses if needed or requested.

What is claimed is:

1. An animal waste collecting apparatus, comprising:
    a garment adapted to be fitted to an animal, said garment defining an opening adapted to expose the perineal region of an animal;
    at least two support posts attached to the garment adjacent said opening of said garment;
    a disposable waste receptacle having an opening and a structural member about said opening of said waste receptacle;
    wherein said structural member of said waste receptacle is removably mounted to said support posts with a gap between said structural member and said garment and adapted when so mounted to have solid waste pass through said structural member and into said receptacle, wherein said structural member has at least one hole for each of said posts, each said hole being offset from a main portion of said structural member and configured to accept a respective post therethrough so that at least a portion of said post is on both sides of said structural member.

2. The apparatus of claim 1 wherein said garment is adapted to be fitted about only the rear of the animal.

3. The apparatus of claim 1 wherein said support posts are arranged on opposite sides of said opening of said garment.

4. The apparatus of claim 1 wherein said waste receptacle comprises biodegradable material.

5. The apparatus of claim 1 further comprising a carrying mechanism attached to the garment.

6. The apparatus of claim 5, wherein said carrying mechanism is a spring-loaded hook adapted to grip said receptacle after said receptacle is removed from said posts.

7. The apparatus of claim 1 wherein said animal waste receptacle possesses a closure device.

8. The apparatus of claim 1 wherein said garment is made of an elastic fabric.

9. The apparatus of claim 1, wherein said gap provides a passage from a point laterally outside said structural member into said opening.

10. An apparatus for collecting animal wastes, comprising:
    a garment adapted to be fitted to an animal, said garment defining an opening about the perineal area of the animal;
    one or more supports attached to said garment near said opening;
    a support member releaseably mounted on said supports attached to said garment, wherein said support member is planar and at least partially ring-shaped and has at least one flange extending laterally from said ring-shaped part and connecting with said supports; and
    an animal waste receptacle mounted on said support member and adapted to collect waste through said support member when the animal defecates, wherein each of said at least one flange has two respective sides and a respective hole entirely through said flange, each said hole configured to accept a respective support therethrough so that at least a portion of said support is on both sides of said flange.

11. The apparatus of claim 10, further comprising a carrying device on said garment to attach said waste receptacle after said waste receptacle has been used.

12. The apparatus of claim 10 wherein the animal waste receptacle is disposable.

13. The apparatus of claim 10 wherein the animal waste receptacle possesses a closure device.

14. The apparatus of claim 10, wherein said support member is a part of said receptacle.

15. The apparatus of claim 10, wherein said garment comprises woven natural or synthetic fibers.

16. The apparatus of claim 15, wherein said garment also includes at least one strap.

17. The apparatus of claim 10, wherein said garment includes a plurality of straps connected to a linking ring, at least one of said straps directly connecting said linking ring to a collar.

18. The apparatus of claim 10, wherein said support member has a perimeter, said perimeter forming a notch adapted to permit free movement of the animal's tail.

19. The apparatus of claim 18, wherein said perimeter is unbroken and has a portion with an outer concave edge adapted to face the animal's tail and to form a boundary of said notch when said support member is connected to said supports and said garment is on the animal.

20. The apparatus of claim 10, wherein said waste receptacle is mounted around substantially the whole of said ring-shaped part of said support member.

21. An apparatus for collecting animal waste, comprising:
 a garment adapted to be fitted to the rear portion of the animal, said garment defining an opening about the anal area of the animal;
 two support posts attached to the garment with substantially a parallel orientation to each other when the garment is fitted to the animal, said posts being situated on opposite sides of said opening of said garment;
 a disposable waste receptacle having an opening;
 a support member affixed around said waste receptacle opening, said support member being at least partially ring-shaped and having two lateral tabs extending outwardly from said support member for connecting with said support posts;
 wherein said support member with said affixed waste receptacle is removably connected via said tabs with said support posts on said garment, so that at least a portion of said support posts are on both sides of their respective tabs, and wherein said support member is separated from said garment by a gap and is adapted to have waste matter pass through said support member and into said receptacle when so connected.

22. The apparatus of claim 21, further comprising a hook connected to said garment, said hook being adapted to hold said receptacle when said receptacle has animal waste within it.

23. The apparatus of claim 22, wherein said hook is a spring-loaded hook.

24. The apparatus of claim 22, wherein said hook is positioned away from said opening in said garment.

25. The apparatus of claim 21, wherein said garment is made from materials from the group consisting of elastic fabric, straps, and combinations thereof.

\* \* \* \* \*